UNITED STATES PATENT OFFICE.

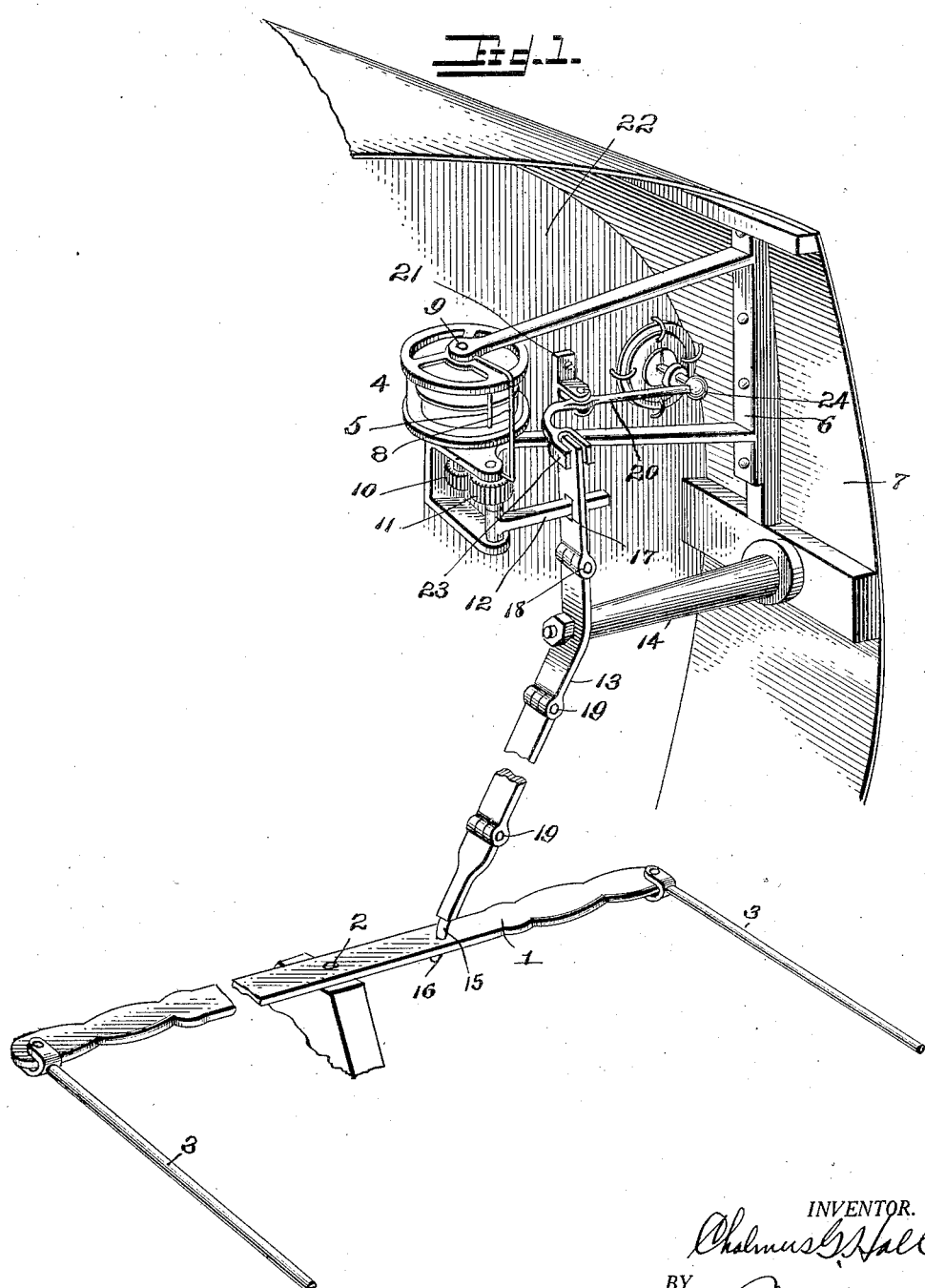

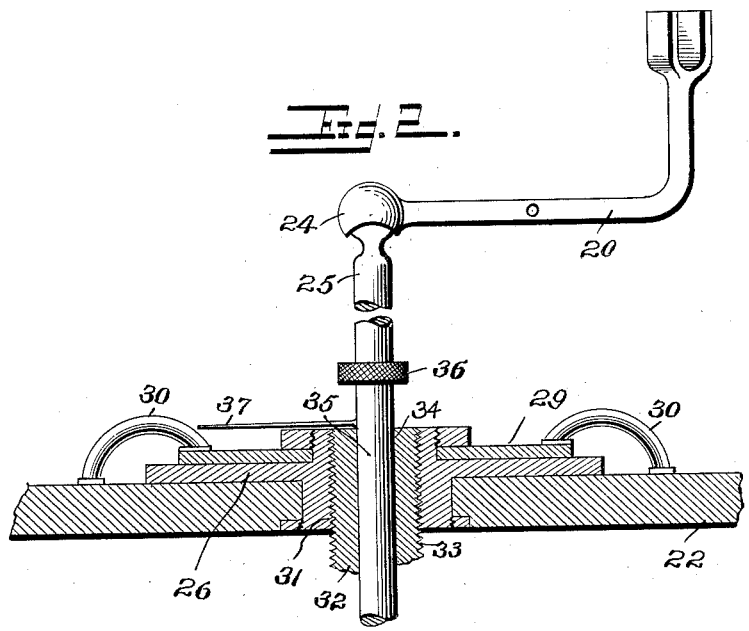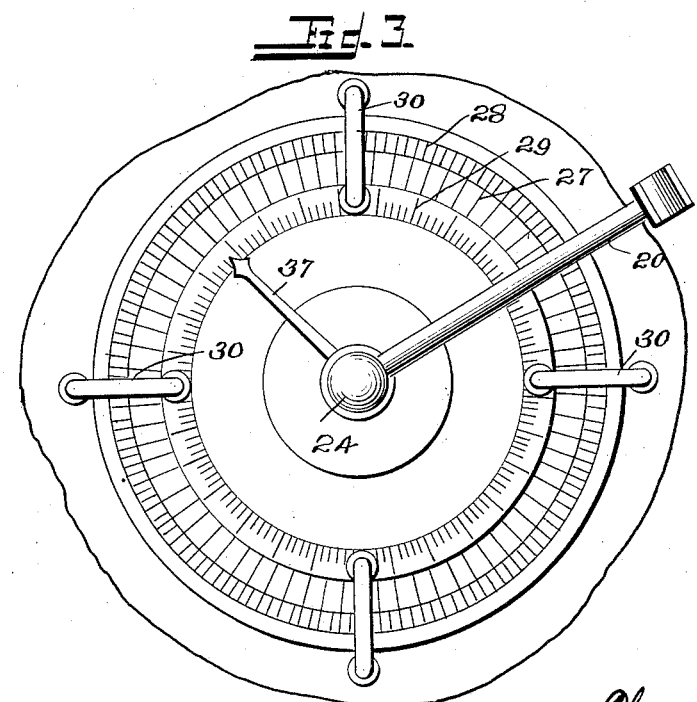

CHALMERS G. HALL, OF WASHINGTON, DISTRICT OF COLUMBIA.

DRIFT-COMPENSATING DEVICE.

1,385,825.  Specification of Letters Patent.  Patented July 26, 1921.

Application filed February 17, 1921. Serial No. 445,658.

*To all whom it may concern:*

Be it known that I, CHALMERS G. HALL, a citizen of the United States, residing at Washington, in the District of Columbia, have invented certain new and useful Improvements in Drift-Compensating Devices, of which the following is a specification.

This invention relates to a drift compensating device designed for use upon aircraft in conjunction with the steering mechanism of the machine, the improved device being adapted to compensate for side drift of the aircraft when flying in a cross-wind.

The invention comprises in connection with a movable lubber line contained in an ordinary aeronautical compass, means whereby said lubber line is moved simultaneously with the vertical rudder an amount proportional to the movement of such vertical rudder. The main object of the present invention is to provide means under the control of the operator of the machine whereby the mechanism of the drift compensating device may be set to operate accurately in accordance with the speed of the engine and also in accordance with the altitude of the aircraft.

When a machine is operating close to the ground or at a low altitude, the speed of the engine and the propeller driven thereby is greater than when flying at a higher altitude. Therefore, the speed of the machine through the air varies according to the altitude and the speed of the engine. The compensating device embodies simple means capable of being adjusted or set, either before or during flight, so as to make proper allowance for side drift and is particularly valuable when flying at night or in foggy or cloudy weather.

Under this invention, when the aircraft is flying in a cross-wind the operator moves the vertical rudder toward the side of the craft against which the cross-wind is blowing. Due to the connection between the vertical rudder operating means and the movable lubber line of the compass, such movement of the vertical rudder to bring the ship back to its true course effects a proportionate movement of the lubber line toward the same side of the aircraft.

Other objects and advantages of the invention will appear as the description proceeds.

In the accompanying drawings:

Figure 1 is a perspective view of the mechanism of the drift compensating device showing the same applied to the interior of a fuselage.

Fig. 2 is an enlarged diametrical section through the manually operable means for setting the drift compensating device in accordance with existing conditions.

Fig. 3 is a face view of the parts shown in Fig. 2.

Referring now to the drawings, 1 designates what is commonly known as the steering foot-bar of an aircraft, the same being ordinarily mounted centrally upon a pivot 2 and having attached to the opposite ends thereof connections 3, such as rods or cables, which extends rearwardly to the vertical rudder.

4 designates a compass having a rotatable casing which carries a movable lubber line 5. The casing 4 is journaled on a vertical axis in a supporting bracket 6, fastened to the interior of the fuselage 7 of an aircraft for convenience of the operator. The frame 6 carries a fixed lubber line 8 which is to be used in conjunction with the movable lubber line 5 in keeping the aircraft on its proper course.

Fast on the shaft 9 of the casing 4 is a gear 10 meshing with another gear 11 from which extends a gear turning arm 12. Movement is imparted to the arm 12 by means of a sectional and jointed lever 13 mounted on a pivot post 14 projecting from the fuselage 7 to which it is fastened.

The lower arm of the lever 13 carries a finger 15 which has a slidable or telescopic connection with said lower arm of the lever 13 and passes through a hole in one arm of the foot-bar 2 to which it is held by any suitable means 16. The upper arm of the lever 13 is formed with a hole 17 through which is inserted the gear turning arm 12 above referred to. The upper arm of the lever 13 is formed with one or more knuckle joints 18 to permit the upper end of said upper arm to be moved toward and away from the axis of the gear 11 for obtaining greater or less leverage thereon and movement thereof in a certain degree of movement of said lever 13. By the means just described the proportional movement between the lever 13 and the arm 12 may be varied. The lower arm of the lever 13 is likewise formed with one or more knuckle joints 19 to avoid any binding action between said lever and the foot-bar.

In order to adjust the position of the upper arm of the lever 13 in relation to the center of movement of the arm 12, I provide what I term a variable throw-regulating element 20, pivotally mounted between its ends on a bracket 21 which is shown in Fig. 1 as secured to the instrument board 22 of the craft. One arm of the lever 20 is provided with a fork 23 which straddles the upper end of the upper arm of the lever 13. Now, by swinging the member 20 on its pivotal mounting it is evident that the upper extremity of the lever 13 will be moved toward or away from the axis of movement of the gear 11, thus providing for a greater or less movement of the arm 12 during a certain amount of movement of the lever 13.

The other arm of the member 20 is connected by a ball and socket joint 24 to a setting member 25, shown in the form of a straight rod which is capable, as hereinafter described, of longitudinal movement for the purpose of accurately swinging the member 20 to any required degree and holding the same in a fixed position after it has been set. The means for shifting the setting member 25 will be best understood by reference to Figs. 2 and 3, wherein the instrument board is indicated at 22. Mounted on said instrument board is a rotatable dial 26 suitably graduated, as indicated at 27. In conjunction with the graduations 27 I also provide other graduations 28 which may be placed directly on the instrument board, said graduations being therefore fixed and being used for reference purposes in setting the dial 26. I also employ another graduated dial 29 of smaller diameter which is non-rotary and which is supported in fixed relation to the instrument board 22 by a series of connecting bars or yokes 30.

The dial 26 has a central internally threaded bore 31 through which passes a bushing or sleeve 32, externally threaded as shown at 33, to engage the internally threaded bore of the dial 26. The sleeve 32 is also internally threaded, as indicated at 34, to engage threads 35 on the setting member 25. The setting member is formed with an enlarged knurled collar or thumb-piece 36 to enable the same to be turned by hand. An indicating hand or pointer 37 extends radially outward from the setting member 25 and sweeps around the graduations on the dial 29.

From the foregoing description it will be understood that endwise movement of the setting member 25 may be obtained in two ways. By turning the dial 26 the threads thereof engage the threads 33 of the sleeve 32, thereby producing an endwise movement of said sleeve and a corresponding endwise movement of the setting member 25. By grasping and turning the milled enlargement 36 on the setting member 25, the latter may be turned within the internally threaded sleeve 32, and this will also effect an endwise movement of said setting member 25. One of said adjustments is used for shifting the setting member 25 and the variable throw-regulating element 20 in accordance with the speed of the engine. The other adjustment is used for shifting the same parts in accordance with the altitude at which the aircraft is operating. In this way proper allowance is made for side drift of the machine according to atmospheric and other conditions prevailing at the time of flight.

The graduated scales above referred to will be calibrated in accordance with the performance of the particular type of craft in conjunction with which the compensating device is to be used. After the dials have been properly calibrated in accordance with any particular aircraft, proper compensation may be made for the direction and strength of the wind and also any variation in the engine speed.

Having thus described the invention, what is claimed is:

1. In combination with an aircraft, a rudder, a compass having a movable lubber line, transmission means to move said lubber line an amount proportional to the movement of said rudder, means to vary the proportionate movement between the lubber line and the rudder consisting of a variable throw-regulating element, and means for adjusting the last named element embodying a setting member, and means to shift said setting member.

2. In combination with an aircraft, a rudder, a compass having a movable lubber line, transmission means to move said lubber line an amount proportional to the movement of said rudder, means to vary the proportionate movement between the lubber line and the rudder consisting of a variable throw-regulating element, and means for adjusting the last named element embodying a setting member, and threaded means to shift said setting member.

3. In combination with an aircraft, a rudder, a compass having a movable lubber line, transmission means to move said lubber line an amount proportional to the movement of said rudder, means to vary the proportionate movement between the lubber line and the rudder consisting of a variable throw-regulating element, and means for adjusting the last named element embodying a setting member, threaded means to shift said setting member, and means including a dial to actuate and indicate the extent of actuation of said threaded means.

4. In combination with an aircraft, a rudder, a compass having a movable lubber line, transmission means to move said lubber line an amount proportional to the movement of said rudder, means to vary the proportionate movement between the lubber line and the rudder consisting of a variable throw-regulating element, and means for adjusting the last named element embodying a threaded setting member, another threaded member in threaded connection with said threaded setting member, and means for turning one of said threaded members to shift the threaded setting member.

5. In combination with an aircraft, a rudder, a compass having a movable lubber line, transmission means to move said lubber line an amount proportional to the movement of said rudder, means to vary the proportionate movement between the lubber line and the rudder consisting of a variable throw-regulating element, and means for adjusting the last named element embodying a threaded setting member, another threaded member in threaded connection with said threaded setting member, means for turning one of said threaded members to shift the threaded setting member, and dial means to indicate the degree of shift of the setting member.

In testimony whereof I affix my signature.

CHALMERS G. HALL.